Nov. 22, 1932.  G. ZAPF  1,888,753

METHOD AND MEANS FOR ANCHORING THE CABLE ENDS OF SUSPENSION BRIDGES

Filed March 25, 1931

G. Zapf
INVENTOR

By: Marks & Clerk
ATTYS.

Patented Nov. 22, 1932

1,888,753

UNITED STATES PATENT OFFICE

GEORG ZAPF, OF COLOGNE, GERMANY, ASSIGNOR TO FELTEN & GUILLEAUME CARLS-WERK ACTIEN-GESELLSCHAFT, OF COLOGNE-MULHEIM, GERMANY

METHOD AND MEANS FOR ANCHORING THE CABLE ENDS OF SUSPENSION BRIDGES

Application filed March 25, 1931, Serial No. 525,299, and in Germany March 22, 1930.

The present invention relates to a new method of and means for anchoring the cable ends of suspension bridges.

According to the present invention segmental plates, which are let into one corner of a rectangular rock cavity, and are provided with holes accessible through slots, serve for the anchoring of the cable ends.

Figure 1:
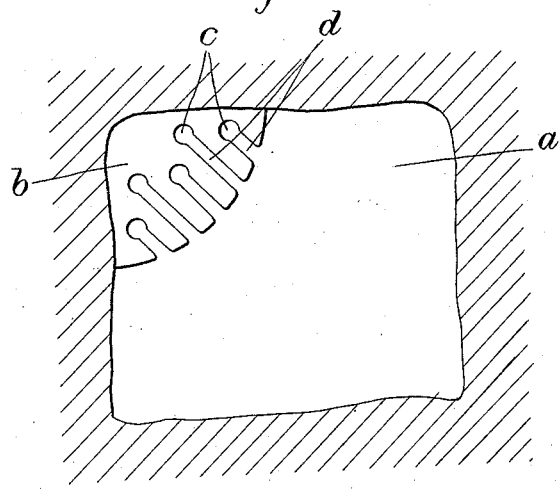
Figure 2:
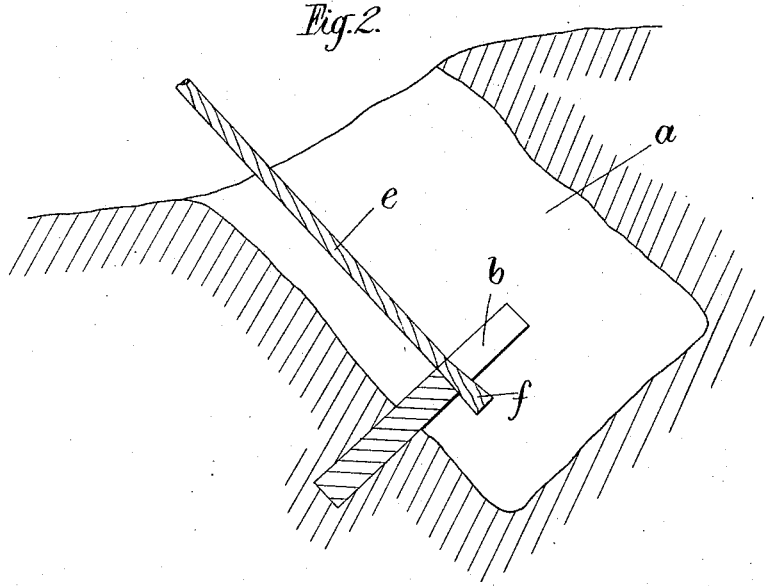

One example of the arrangement according to the invention is illustrated in the accompanying drawing, in which Figure 1 is a diagrammatic view looking down into the cavity at the surface of the segmental plate, and Figure 2 is a side sectional elevation through the cavity and the plate, the cable being shown only in Figure 2.

In one corner of a rectangular cavity $a$ in the rock a recess is drilled and inserted in said recess is a segmental plate $b$, which is provided with holes $c$, accessible from the segmental edge of the plate by slots $d$. The dimensions of the holes and of the slots will be determined according to the diameter of the cables $e$. Each cable $e$ is introduced through one of the slots $d$ from the side in such a manner that the cable end $f$ bears from below against the plate $b$ as an abutment.

It will be observed that the plate is of such dimensions that a large portion thereof extends into the cavity, and that the holes $c$ are spaced from the walls of the cavity. By placing the holes in this manner, the cables will be held spaced from the walls of the cavity thereby eliminating abrasions thereof against the rock surface.

What I claim is:—

An anchoring device for the terminals of suspension bridge cables comprising a plate having a part embedded in the corner of an angular shaped cavity formed in a rock, the plate bridging the space between the two sides of the cavity, portions of the side edges of the plate being embedded in the side walls of the cavity and spaced a distance from its back wall, the plate extending into the cavity, the extended portions having slots therein and holes communicating with the slots, said holes being spaced from any of the walls of the cavity, the cable terminals being passable through the slots into the holes and having enlargements thereon engaging the plate to prevent withdrawal of the terminals from the holes.

In testimony whereof I have signed my name to this specification.

GEORG ZAPF.